United States Patent
Dack et al.

(10) Patent No.: US 9,855,879 B1
(45) Date of Patent: Jan. 2, 2018

(54) SUPPORT ASSEMBLY FOR MOUNTING AN ACCESSORY TO A WORK UTILITY VEHICLE

(71) Applicant: EXTENDQUIP, LLC, Schofield, WI (US)

(72) Inventors: Marcus F. Dack, Schofield, WI (US); Matt Bach, Mosinee, WI (US); Walter A. Osswald, Mosinee, WI (US); Nick Long, Wausau, WI (US); Chris Osswald, Rothschild, WI (US); Marc Bogue, Beresford, SD (US)

(73) Assignee: Extendquip, LLC, Schofield, WI (US)

( * ) Notice: Subject to any disclaimer, the term of this patent is extended or adjusted under 35 U.S.C. 154(b) by 0 days.

(21) Appl. No.: 15/285,572

(22) Filed: Oct. 5, 2016

(51) Int. Cl.
*B66F 11/04* (2006.01)
*B60P 3/14* (2006.01)
*B60R 9/06* (2006.01)
*B60R 11/00* (2006.01)

(52) U.S. Cl.
CPC .......... *B60P 3/14* (2013.01); *B60R 9/06* (2013.01); *B60R 11/00* (2013.01); *B60R 2011/005* (2013.01)

(58) Field of Classification Search
CPC .... B60P 3/14; B60P 3/00; B60R 11/00; B60R 2011/008; B60R 2011/0082; B60R 2011/0084; B60R 2011/004
See application file for complete search history.

(56) References Cited

U.S. PATENT DOCUMENTS

| | | |
|---|---|---|
| 3,664,459 A | 5/1972 | Stephens et al. |
| 4,010,626 A | 3/1977 | Jones |
| 4,456,414 A * | 6/1984 | Williams ............ B60P 1/64 296/35.1 |
| 6,044,927 A | 4/2000 | Newlin |
| 6,050,365 A | 4/2000 | Newlin |
| 6,336,594 B1 | 1/2002 | Bader et al. |
| 6,349,793 B1 | 2/2002 | Kincaid |
| 6,425,459 B1 | 7/2002 | Keefer |
| 6,460,653 B1 | 10/2002 | Hardy et al. |
| 6,571,913 B2 | 6/2003 | Puszkiewicz et al. |
| 6,651,775 B2 | 11/2003 | Bassett, Jr. |
| 6,679,479 B1 | 1/2004 | Watkins |
| 6,705,238 B1 | 3/2004 | Heckert |
| 6,761,248 B1 | 7/2004 | Harbison |
| 6,883,641 B2 | 4/2005 | Julien |
| 7,004,286 B2 | 2/2006 | Fredette |

(Continued)

*Primary Examiner* — Brian L Swenson
(74) *Attorney, Agent, or Firm* — Nikolai & Mersereau, P.A.; Thomas J. Nikolai

(57) ABSTRACT

A single operator is able to couple and decouple a work accessory from a UTV by employing a mounting mechanism comprising a channel assembly coupled to the UTV having channels adapted to receive rails of a rail assembly mounted to the work accessory. Wedges associated with the rails and wedge plates associated with the channels at the distal ends of the rails and channels and rail locks at the proximal ends of the rails and channels are employed to secure the rails in the channels to couple the work accessory to the UTV. Adjustable legs coupled to the rail assembly are used to support the work accessory when not coupled to the UTV, to level and stabilize the work accessory, and to adjust the height of the rails relative to the bottom of the channels when coupling and decoupling the UTV and work accessory.

20 Claims, 13 Drawing Sheets

(56) References Cited

U.S. PATENT DOCUMENTS

| | | | |
|---|---|---|---|
| 7,055,912 B2 | 6/2006 | Luscombe | |
| 7,093,691 B1 | 8/2006 | Vaughan et al. | |
| 7,172,378 B1 * | 2/2007 | Cerullo | B60P 1/6454 |
| | | | 410/80 |
| 7,770,695 B2 | 8/2010 | Myers | |
| 7,815,015 B2 | 10/2010 | Kerns | |
| 8,052,120 B2 | 11/2011 | Bacon | |
| 8,267,222 B2 | 9/2012 | Cui | |
| 8,292,032 B2 | 10/2012 | Knaak | |
| 8,505,684 B1 | 8/2013 | Bogue | |
| 8,678,135 B2 | 3/2014 | Crook et al. | |
| 8,733,508 B2 | 5/2014 | Bacon | |
| 8,844,206 B2 | 9/2014 | Johnstone | |
| 8,910,749 B1 | 12/2014 | Jensen | |
| 2004/0207226 A1 * | 10/2004 | Johnson | B60P 3/14 |
| | | | 296/50 |
| 2014/0069413 A1 * | 3/2014 | Galatte | F24C 15/08 |
| | | | 126/25 R |
| 2016/0031354 A1 * | 2/2016 | Miles | B60P 1/4414 |
| | | | 211/1.51 |
| 2017/0066360 A1 * | 3/2017 | Bushek | B60P 1/433 |
| 2017/0101063 A1 * | 4/2017 | Weihl | B60R 11/06 |

\* cited by examiner

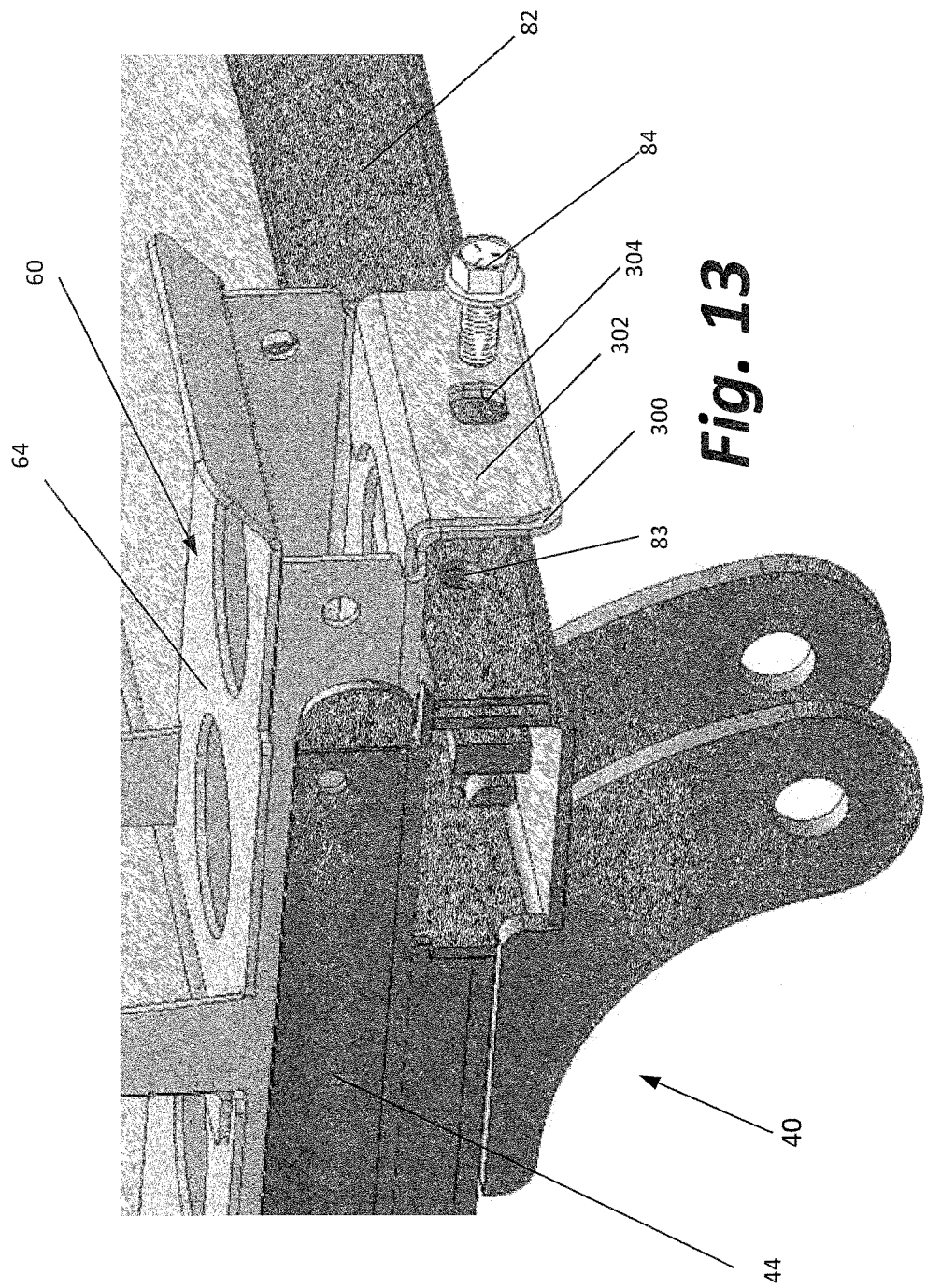

SUPPORT ASSEMBLY FOR MOUNTING AN ACCESSORY TO A WORK UTILITY VEHICLE

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention relates to work utility vehicles and the mounting of work accessories to work utility vehicles. More specifically, the present invention relates to mounting and support assemblies that can be used to (i) quickly and securely attach a work accessory to a work utility vehicle, (ii) level and stabilize the work vehicle and an attached work accessory while the work accessory is being used for its intended purpose, and (iii) quickly detach the work accessory from the work vehicle.

II. Related Art

Work utility vehicles, often referred to as UTVs, are manufactured and sold by a variety of companies. Such companies include Kubota, Bobcat, ODES, Cub Cadet, and John Deere. UTVs are self-powered because they have their own motor, typically an internal combustion engine. UTVs are conveniently small, highly maneuverable, and rugged. This allows a UTV to traverse rough terrain and access tight spaces. UTVs typically include an engine compartment at the front, a cab in which an operator and passenger can sit, and a rear bed typically used for hauling. The operator from the cab of the UTV can shift gears, steer, accelerate and brake the vehicle just like the driver of the standard automobile.

A variety of work accessories are available for UTVs. Such work attachments include plow blades and loaders mountable to the front of the UTV; carts, wagons and tillers that can be mounted to a hitch at the rear of the UTV; and cargo boxes and sprayers adapted to be attached to the bed of the UTV. At the present time, however, the available work accessories are limited. Also, changing the work accessory mounted to the bed area of a UTV is a laborious and time-consuming task that typically requires more than one person to perform. This is because there presently does not exist a universal mounting system that allows any of a variety of work accessories to be quickly and easily connected to and disconnected from the bed area of a UTV, or that can be used to stabilize and level the UTV as a work accessory, so mounted, is used for its intended purpose.

SUMMARY OF THE INVENTION

The present invention is directed to universal mounting assemblies that can be employed to mount any of a variety of work accessories to the bed area of a UTV. The mounting assembly allows for quick coupling and decoupling of the work accessory to the UTV and further serves to level and stabilize the UTV and work accessory as the work accessory is being used for its intended purpose. The UTV is used to transport the work accessory between locations and to support the work accessory as the work accessory is being used at a specific location.

The UTV is self-powered and steerable. The UTV has a front, a rear and a frame assembly between the front and rear. The work accessory can be any type of tool including and supported on a base. For example, the work accessory can be a work platform adapted to be raised and lowered by a scissor lift mechanism operated by a telescoping actuator. The scissor lift mechanism is coupled to the base and the work platform. Other examples of work accessories include, without limitation, sprayers, spreaders, cargo boxes, and dump boxes.

A mounting assembly is provided to enable the work accessory to be coupled to and decoupled from the UTV. The mounting assembly includes a channel assembly and a rail assembly.

The channel assembly is coupled to the frame of the vehicle and comprises a first channel and a second channel extending parallel to each other above the frame of the vehicle from a location adjacent the rear of the vehicle toward the front of the vehicle. Each of the channels is defined by a bottom wall, a pair of spaced apart side walls projecting upwardly from the bottom wall, an open top, an open proximal end, and a wedge plate defining the distal end of the channel. The wedge plate extends at an angle upwardly and rearwardly between the two side walls.

The rail assembly is coupled to the base of the work accessory. The rail assembly comprises first and second rails extending parallel to each other below the base of the work accessory. The rails each have a proximal end portion and a distal end portion. The distal end portion of each rail comprises a wedge. The rails are adapted to simultaneously slide into the channels of the channel assembly until the wedge of each rail engages the wedge plate of each channel to secure the distal end of the rail in the channel. A lock is provided for securing the proximal end portion of each rail in place with respect to the channel when the rails reside in the channels.

Various rail locking mechanisms may be employed. In one embodiment the rail locking mechanism comprises first holes through the two side walls of one of the channels adjacent the open proximal end of the channel and a second hole (or holes) through the rail received in the channel adjacent the proximal end of the rail. The first holes and second hole(s) are adapted to be aligned when the rail is in the channel and the wedge of the rail is in locking engagement with the wedge plate. The rail lock further comprises a pin adapted to be received within the aligned first holes and second hole(s). Alternatively, or in addition, the rail lock may include a plate adapted to be selectively coupled (such as by a bolt) to the frame of the vehicle and engage one of the rails when that rail resides within one of the channels. This plate may be mounted to a bar adapted to swing about an axis between a locked position and an unlocked position. Various mechanisms may be used to retain the bar in the locked position. One example is a pin adapted to pass through a hole in the bar (or a plate attached to the bar) when the hole is aligned with the hole of eye bolts coupled to the channel assembly of the vehicle.

A set of legs coupled to the work accessory or rail assembly may also be provided. In at least some embodiments, this set of legs includes a front pair of legs and a back pair of legs. The distance between vertical sections of two legs of the front pair of legs is greater than the width of the utility vehicle. Each of the vertical sections of the legs comprises telescoping sections adapted to permit the length of the legs to be adjusted. Both a gross adjustment mechanism and a fine adjustment mechanism may be provided. Fine adjustment of the length of the legs may be provided by an internal screw jack and crank. When turned in a first direction, the crank acts upon the screw jack to cause the telescoping sections to move toward an elongate configuration. When turned in the opposite direction, the crank acts upon the screw jack to cause the telescoping sections to move toward a retracted position. Gross adjustment may be provided by selectively aligning any of a series of holes extending along the length of one of the telescoping sections with a hole in another telescoping section and inserting a locking pin through the aligned holes.

A foot projects outwardly from the bottom of each leg. These feet allow the legs to provide support even when the work accessory is located in an area where the ground is soft. The surface area of the bottom of the feet inhibit the legs from sinking into the ground. Alternatively, the bottom of the legs may be coupled to wheels to permit the work accessory to be moved even when not coupled to the UTV. At least two of these wheels may have casters for steering. The wheels may also be equipped with wheel locks to selectively prevent rotation of the wheels.

Legs of the type described above are well suited to perform several important functions. First, the telescoping legs permit alignment of the height of the rails with the height to the channels when coupling the work accessory to the utility vehicle. When so aligned, the operator simply backs the work utility vehicle up so the rails effectively slide into the channels to couple the vehicle to the work accessory via the channels and rails. The rail lock(s) are then employed to lock the work accessory in place on the work utility vehicle. The legs are then telescoped to raise their feet (or wheels) off the ground and the vehicle can then be used to transport the work accessory to a work location.

Second, the operator is able to decouple the work accessory from the utility vehicle by simply telescoping the legs to lower the feet (or wheels) into ground engagement, removing the rail lock(s) and then driving forward to effectively slide the rails out of the channels.

Third, such legs are adapted to level and stabilize the work accessory when the work accessory is coupled to the vehicle at the job site. This is achieved by returning the feet of each leg into ground engagement and selectively adjusting the length of each leg until the work accessory is level and balanced. This third function of the legs is particularly important when the work accessory is the aforementioned work platform and the work platform is either being raised or lowered or is in its raised position.

Fourth, the legs may be used to support the work accessory when the work accessory is not attached to the vehicle. If the legs include wheels, the wheels allow the work accessory to be rolled to any desired location. For example, the work accessory may be pushed to a location behind the UTV so that the rails and channels are aligned. The work accessory may then be pushed forward so that the rails enter the channels through the open proximal ends of the channels and are then advanced through the channels until the wedges of the rails are seated beneath and engage the wedge plates to couple the work accessory to the UTV. Similarly, the work accessory may be rolled back to slide the rails out of the channels to decouple the work accessory from the UTV.

Various other features may be provided. For example, the channel assembly may be removably coupled, rather than permanently coupled, to the frame of the utility vehicle. Also, the channel assembly may be pivotally coupled to the frame of the utility vehicle. The channel assembly may also include a brace extending between the first channel and the second channel. As noted above, the rail lock assembly may also include an end plate associated with each channel. The end plate may be coupled by a bolt or other coupling device to the frame assembly of the vehicle or to a component of the channel assembly such that the end plate engages the proximal end portion of the rail to hold the rail in the channel.

BRIEF DESCRIPTION OF THE DRAWINGS

The foregoing features, objects and advantages of the invention will become apparent to those skilled in the art from the following detailed description and with reference to the following drawings in which like numerals and the several views refer to corresponding parts.

FIG. 13 is a perspective view showing still another rail lock assembly.

DETAILED DESCRIPTION OF THE INVENTION

Figure 1:
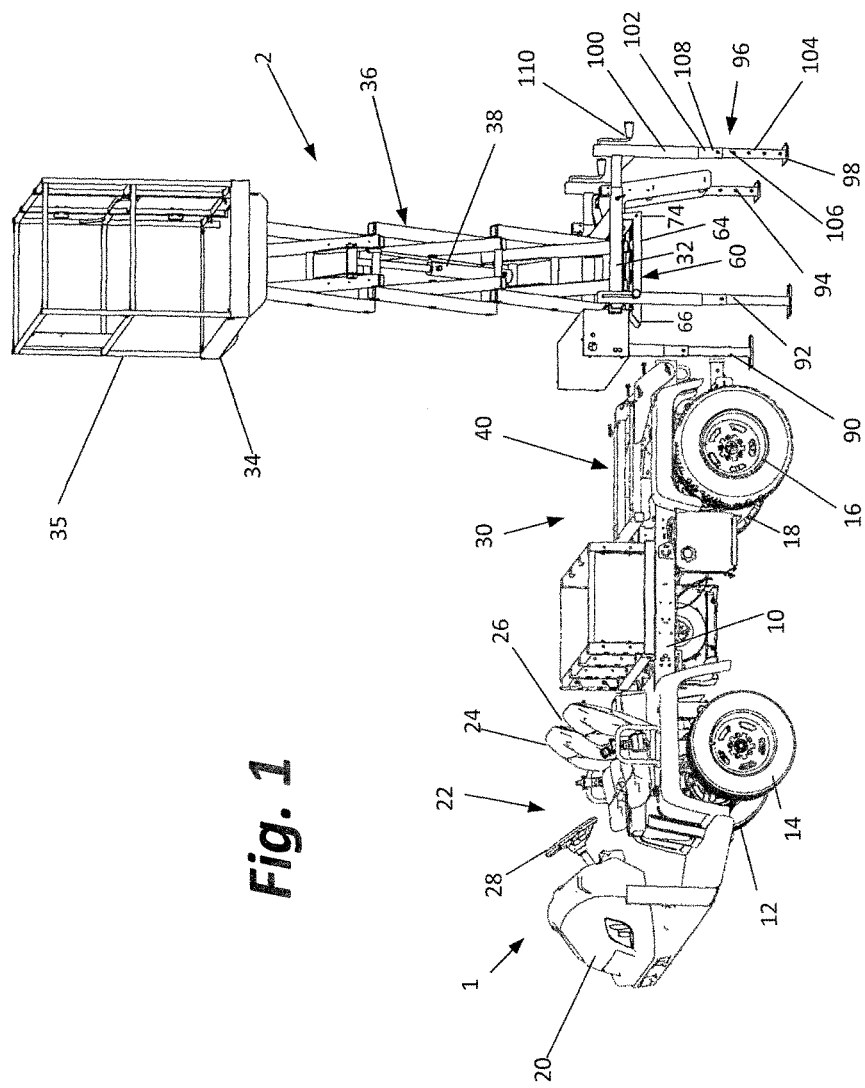
FIG. 1 is a perspective view of a work utility vehicle and a work accessory adapted to be attached to the work utility vehicle.

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivatives thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

FIG. 1 illustrates a UTV 1 and a work accessory 2 adapted to be mounted to the UTV 1. The UTV 1 includes a frame 10 supported by four wheels 12, 14, 16, and 18. The frame 10 supports an engine compartment 20 in which a motor (typically an internal combustion engine) is located. The engine is used to drive the wheels 12-18 of the UTV 1.

The frame 10 also supports a cab area 22 with two seats 24 and 26 for an operator and a passenger. The cab area 22 includes a steering wheel 28 for steering the front wheels 12 and 14 of the UTV, a gear shift (not shown) for placing the UTV in park, forward and reverse, an accelerator (not shown) for controlling the speed of the vehicle, and a brake pedal (not shown) for slowing or stopping the vehicle. Behind the cab area is a bed area 30.

The work accessory 2 can be any type of work accessory. Examples of such work accessories include, without limitation, sprayers, spreaders, saws, log splitters, tree stands used for hunting, diggers, dump boxes, tool boxes, cargo boxes, cargo racks, work benches, fluid tanks, pumps or electrical generators. The work accessory 2 illustrated in the drawings is a platform lift machine. The platform lift machine includes a base 32, a work platform 34 and a railing 35, a scissor lift mechanism 36 and a telescoping lift actuator 38 such as hydraulic cylinder. The scissor lift mechanism 36 is disposed between base 32 and work platform 34. The actuator 38 is employed to operate the scissor lift mechanism 36 to raise and lower the assembly comprising work platform 34 and railing 35.

A mounting assembly is provided to couple the platform lift machine (or any other work accessory 2) to the UTV 1. The mounting assembly comprises a channel assembly 40 mounted to the frame 10 in the bed area 30 of the UTV 1. The mounting assembly further comprises a rail assembly 60 mounted to the work accessory 2 below the base 32 of work accessory 2.

Figure 2:
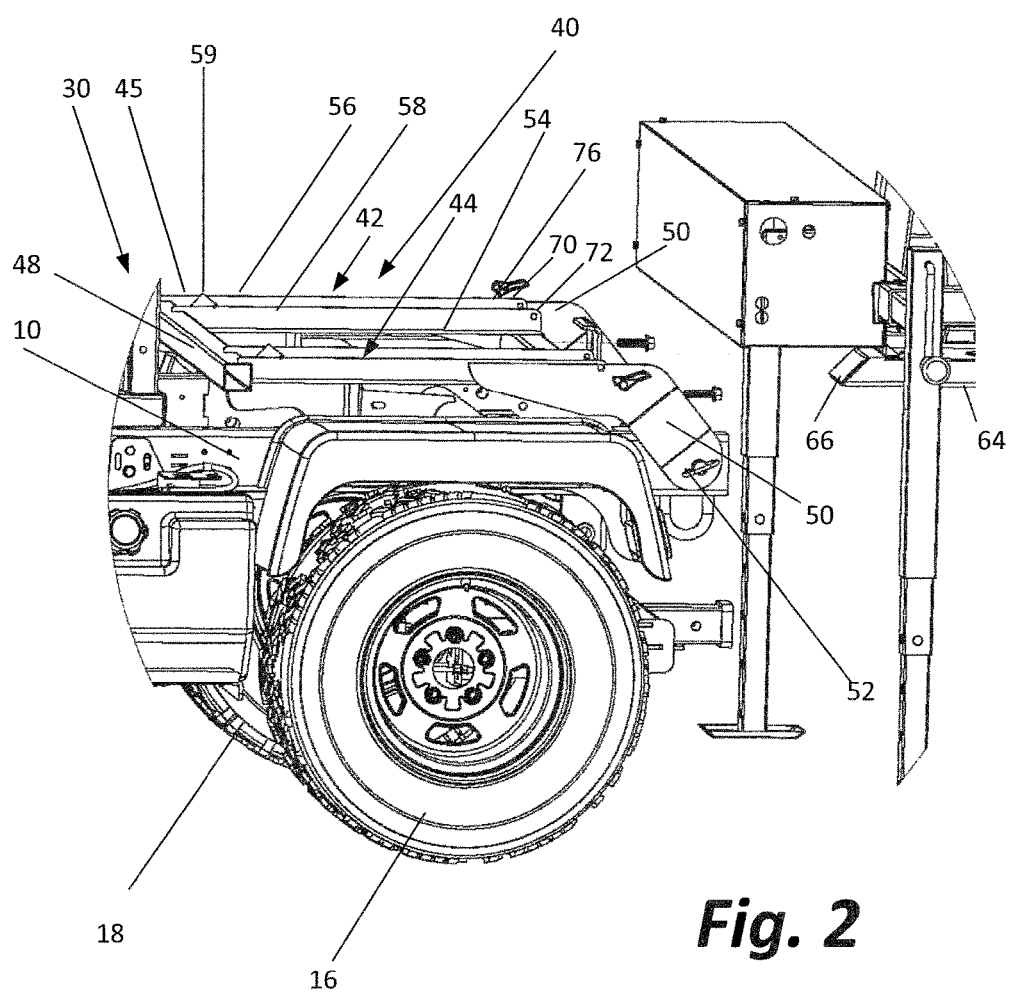
FIG. 2 is a perspective view illustrating a mounting assembly used to couple together the work accessory and work utility vehicle of FIG. 1.
Figure 3:
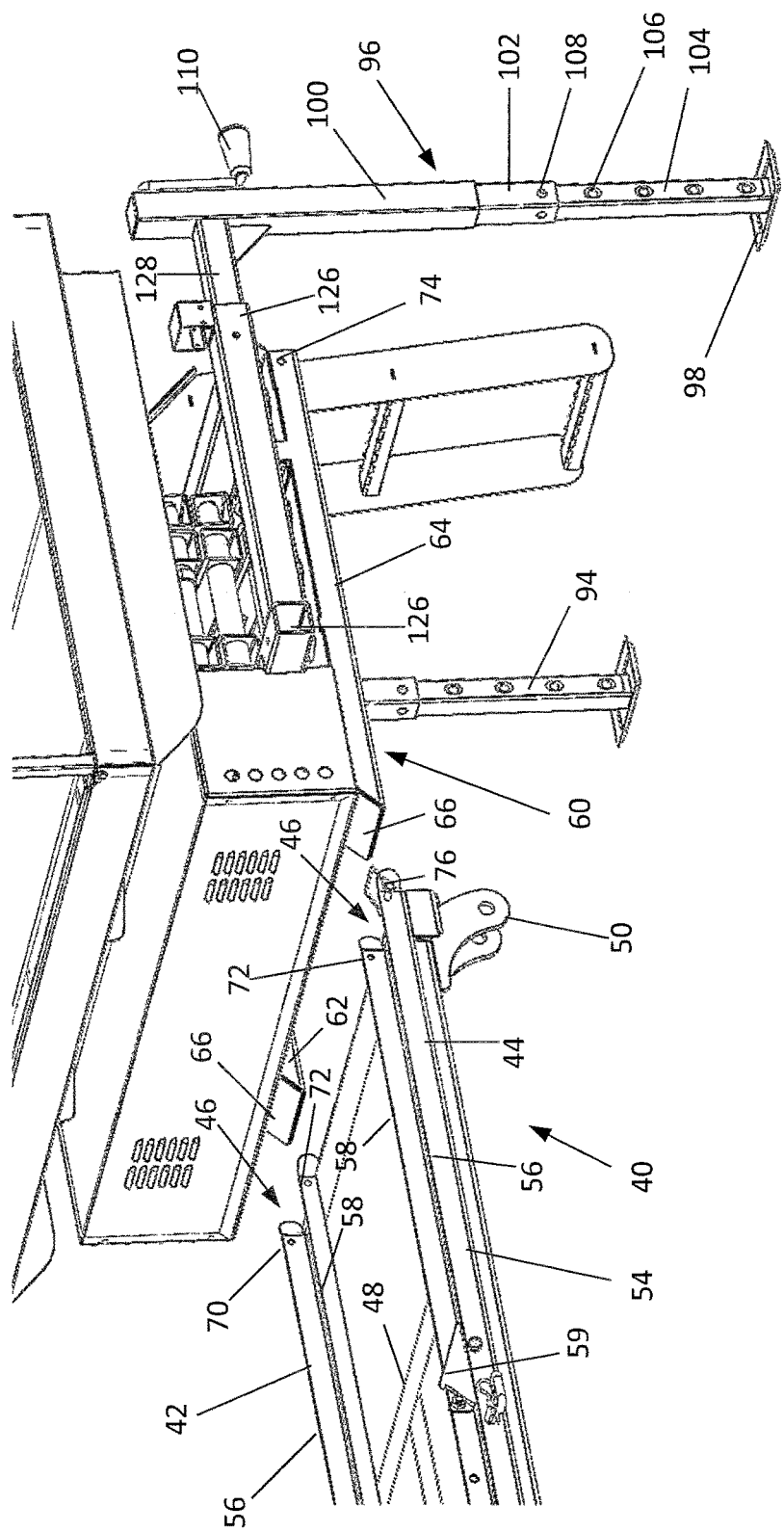
FIG. 3 is a perspective view illustrating the mounting assembly of FIG. 2, but with the channel assembly removed from the UTV so the components of the channel assembly may be more easily understood.

As shown in FIGS. 2 and 3, the channel assembly 40 comprises a pair of channels 42 and 44. Channels 42 and 44 extend parallel to each other from a location adjacent the rear of UTV 1 toward the front of UTV 1. The distal end 46 of each channel 42 and 44 is connected to a brace 48. The proximal end of each channel is coupled to a mounting plate 50. Two different styles of mounting plates 50 are shown in FIGS. 2 and 3. In either case, the mounting plates 50 connect the channel assembly 40 to the frame 10 of UTV 1. Pins, such as pin 52, may be employed to make this connection in which case the channel assembly 40 may be permitted to rotate about the axis of rotation defined by the pins 52. The brace 48 may be locked to the frame 10 whenever it is desired to prevent such rotation by any suitable conventional mechanism.

Each channel is defined by a bottom wall 54 and a pair of side walls 56 and 58 projecting upwardly from the bottom wall 54. The top of each channel is open as is the proximal end 46 of each channel. Located at and essentially defining the distal end 45 of each channel, and extending at an angle upwardly and rearwardly from the bottom 54 between the two side walls 56 and 58, is a wedge plate 59.

The rail assembly 60 mounted to the underside of base 32 can be seen in FIGS. 1 and 2. Rail assembly 60 includes a first rail 62 and a second rail 64. Rails 62 and 64 extend parallel to each other in a fixed position relative to the base 32. The distance between the rails and the size and shape of the rails permits rail 62 to slide into (or out of) channel 42 through the open proximal end of channel 42 as rail 64 slides into (or out of) channel 44 through the open proximal end of channel 44. As best seen in FIG. 2, rails 62 and 64 each have a distal end portion comprising a wedge 66. The wedges 66 are adapted to engage the wedge plates 59 of channels 42 and 44 to secure the distal end portions of the rails 62 and 64 in the respective channels 42 and 44. To reduce material costs, the rails may be hollow and comprise top, bottom and side walls. The proximal end may be open. The distal end, however, will be closed to form the wedge 66.

Figure 4:
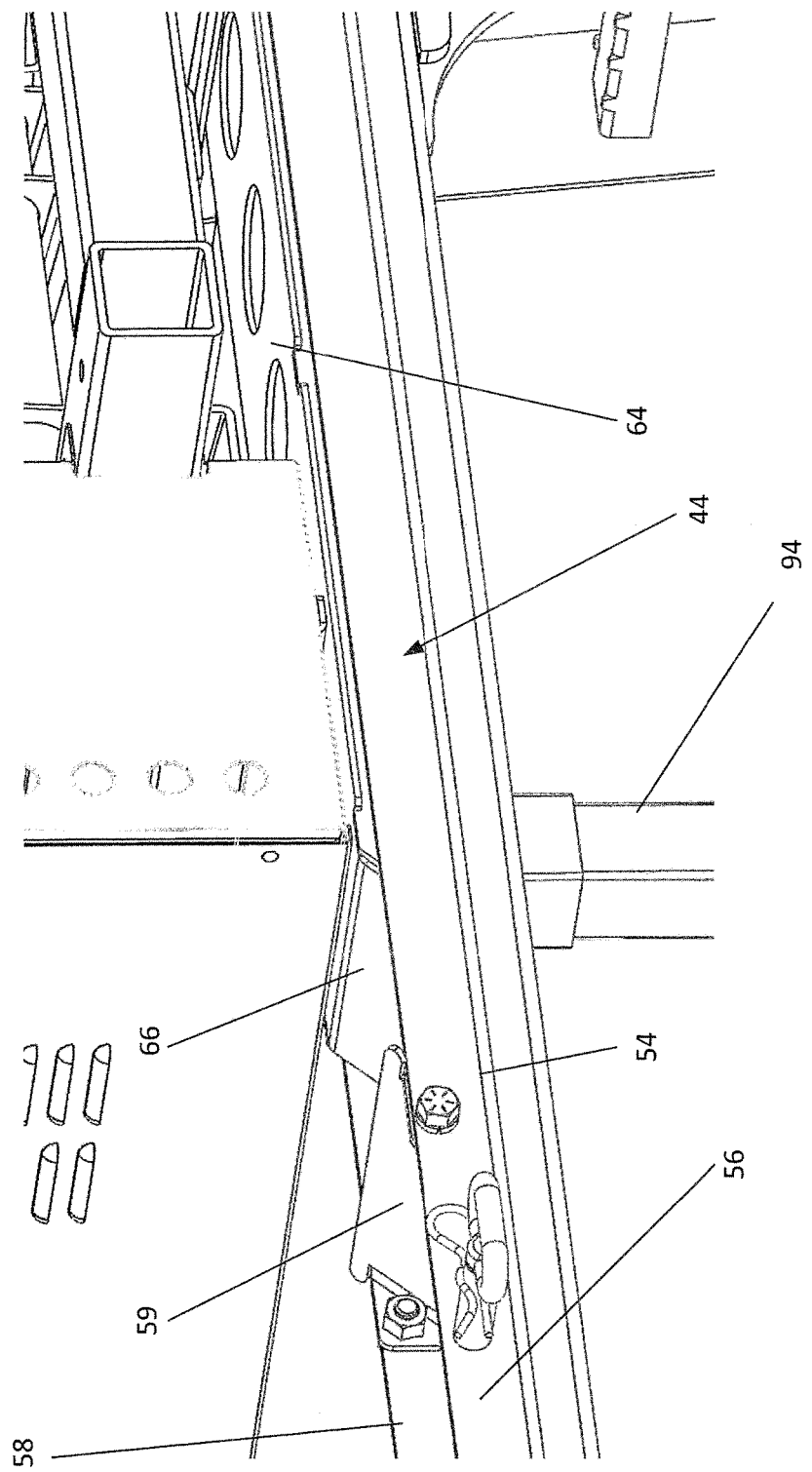
FIG. 4 is a perspective view of the mounting assembly of FIG. 2 showing one of the rails of the rail assembly partially inserted into one of the channels of the channel assembly.
Figure 5:
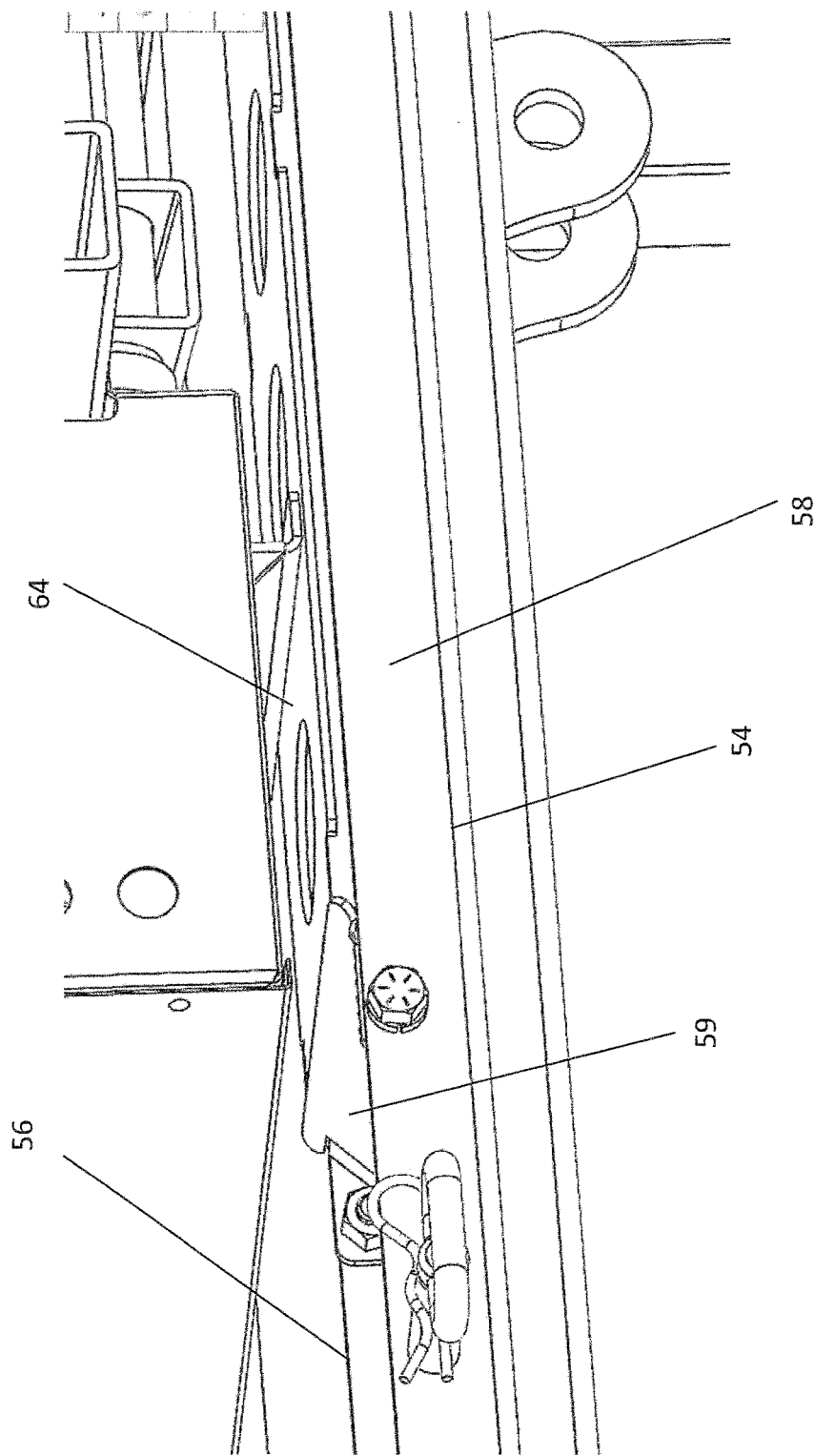
FIG. 5 is a perspective view similar to FIG. 4, but with the rail fully inserted into the channel.

Various rail locking arrangements may be employed to secure the proximal ends of the rails 62 and 64 in the respective channels 42 and 44. Two such rail locking arrangement are shown in FIGS. 3 and 4. These locking arrangements may be employed separately or together.

As shown in the drawings, aligned first holes 70 and 72 are present in and extend through the side walls 56 and 58 of each channel 42, 44 near the proximal end of each channel. A second hole 74 extends through each of rails 62, 64 near the proximal end. Of course, if the rails are hollow, the second hole 74 will actually be two aligned holes passing through the side walls of the rails. The second hole(s) 74 is adapted to be aligned with the first holes 70, 72. When the rails 62, 64 are located in the channels 42, 44 with the wedges 66 engaging the wedge plates 59. Lock pins, such as pin 76, may then be passed through the aligned holes 70, 72 and 74 to lock the proximal end of the rail 62, 64 to the proximal end of the channel 42, 44.

Figure 6:
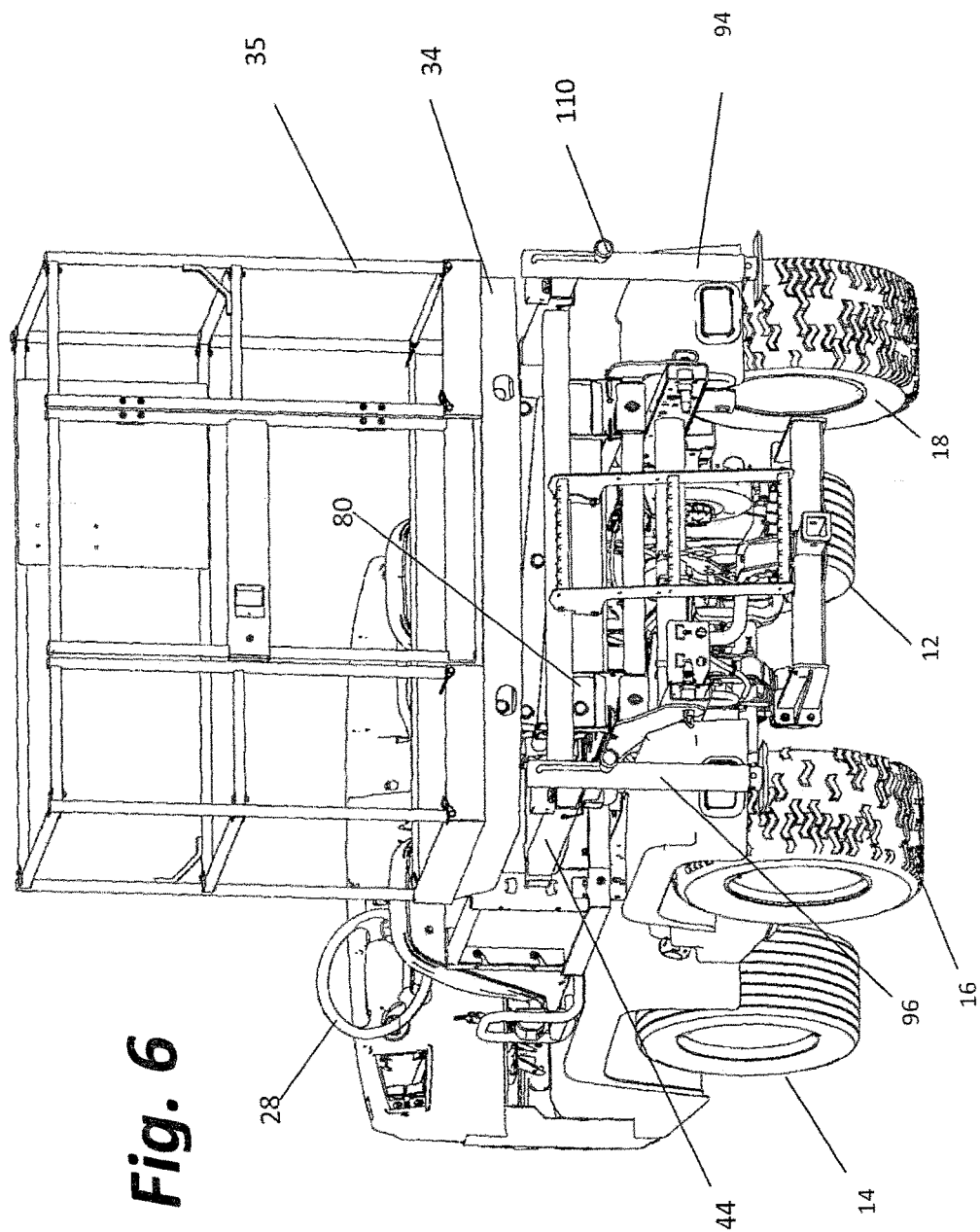
FIG. 6 is a rear perspective view showing the work utility vehicle and work accessory of FIG. 1 coupled together.
Figure 7:
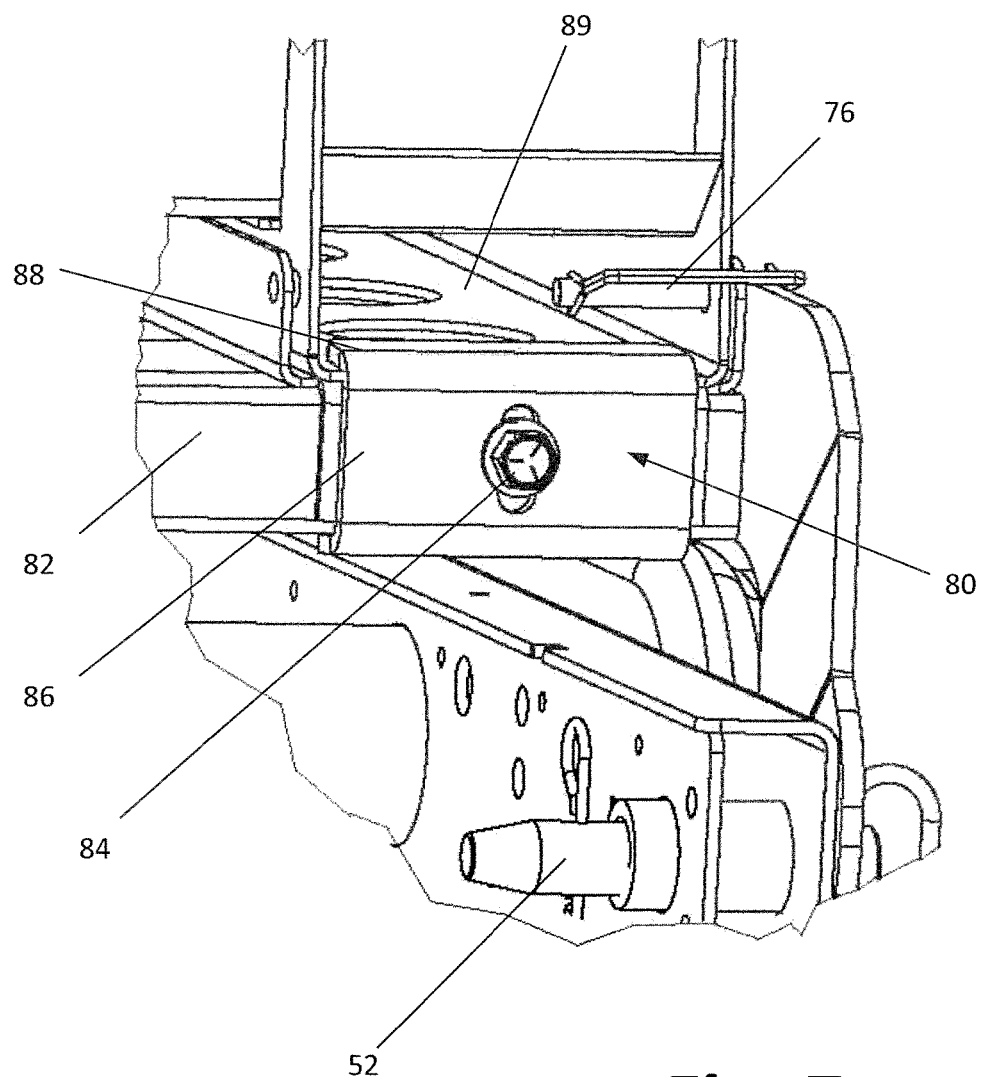
FIG. 7 is a perspective view showing a rail locking assembly for securing the work accessory and work utility vehicle of FIG. 1 together.
Figure 8:
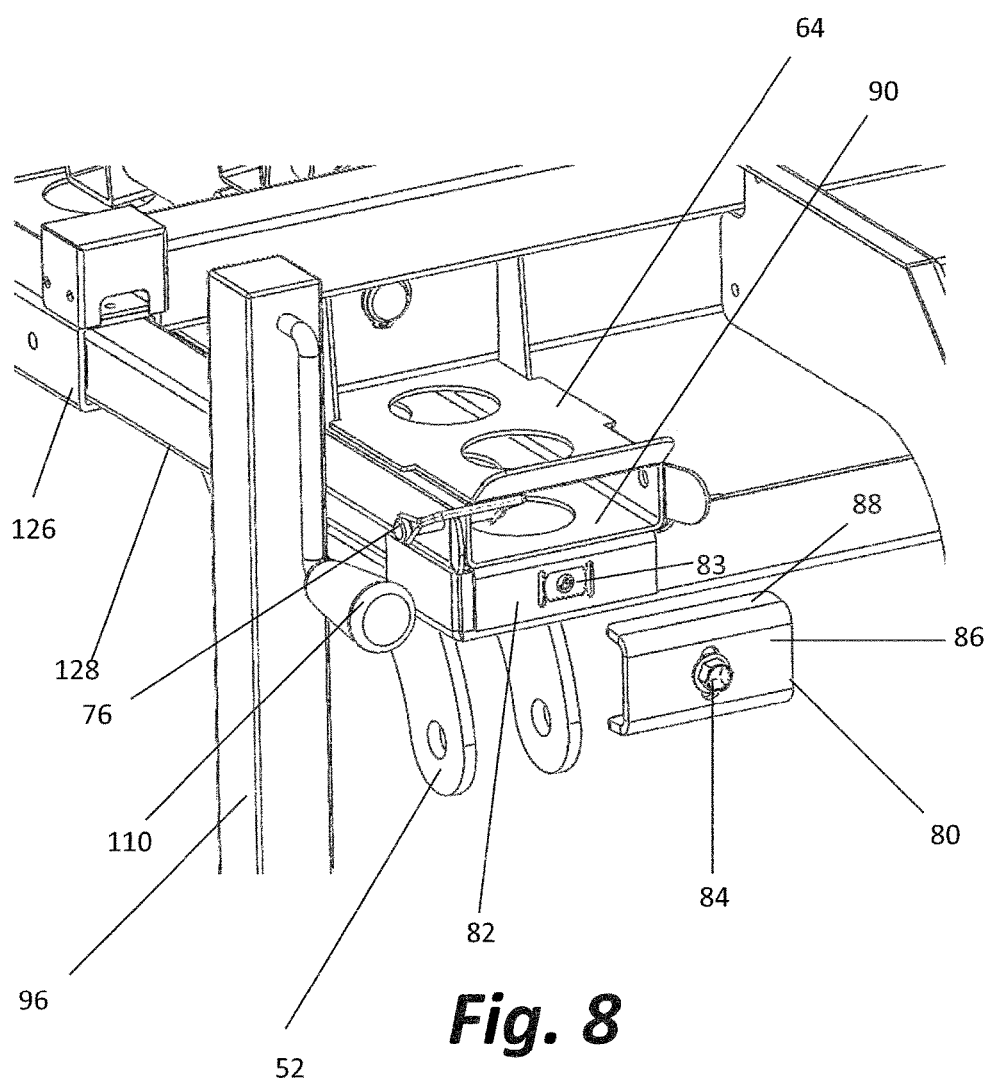
FIG. 8 is a perspective view similar to FIG. 7, but with the lock plate of the rail locking assembly removed.

The drawings in FIGS. 6-8 also illustrate an alternative rail lock arrangement comprising a lock plate 80 adapted to be bolted to a frame member 82 which may be a part of the UTV 1 or the channel assembly 40. The lock plate 80, when selectively bolted in place by bolt 84, has a first portion 86 that engages the end of one of rails 62, 64 and a second portion 88 that engages an upwardly facing surface 90 of the rail 62, 64 to selectively lock the proximal end of the rail 62, 64 in the channel 42, 44. More specifically, the lock plates 80 are adapted to prevent reward and upward movement of the rails 62, 64 relative to the channels 42, 44 when the lock plates 80 are bolted in place by the bolts 84. When the rail 62, 64 is hollow, the end and the upwardly facing surface 90 are both part of the bottom wall of the rail.

Secured to the base 32 of the work accessory or rail assembly 60 are four telescoping legs 90, 92, 94 and 96. Attached to the bottom of each leg is a foot 98. The feet 98 are longer and wider than the base of the legs and serve to prevent the legs from sinking into soft ground. The feet 98 may be replaced by wheels (not shown). Such wheels should include wheel locks to selectively prevent rotation of the wheels. At least two of the wheels may be castered for steering the work accessory. Employment of such wheels allow the work accessory 2 to be easily moved even when not coupled to the UTV 1.

As shown, each leg has three telescoping sections 100, 102 and 104 making the length of each of legs 90, 92, 94 and 96 adjustable. The bottom telescoping section 104 has a series of vertically arranged holes 106 and the middle telescoping section 102 of each leg has a hole 108 adapted to be selectively aligned with any of holes 106. A bolt or safety pin (not shown) may be passed through the aligned holes to secure telescoping sections 104 and 102 in place. This arrangement of holes 106 and 108 and the bolt or safety pin provides a gross adjustment of the length of the leg.

Figure 9:
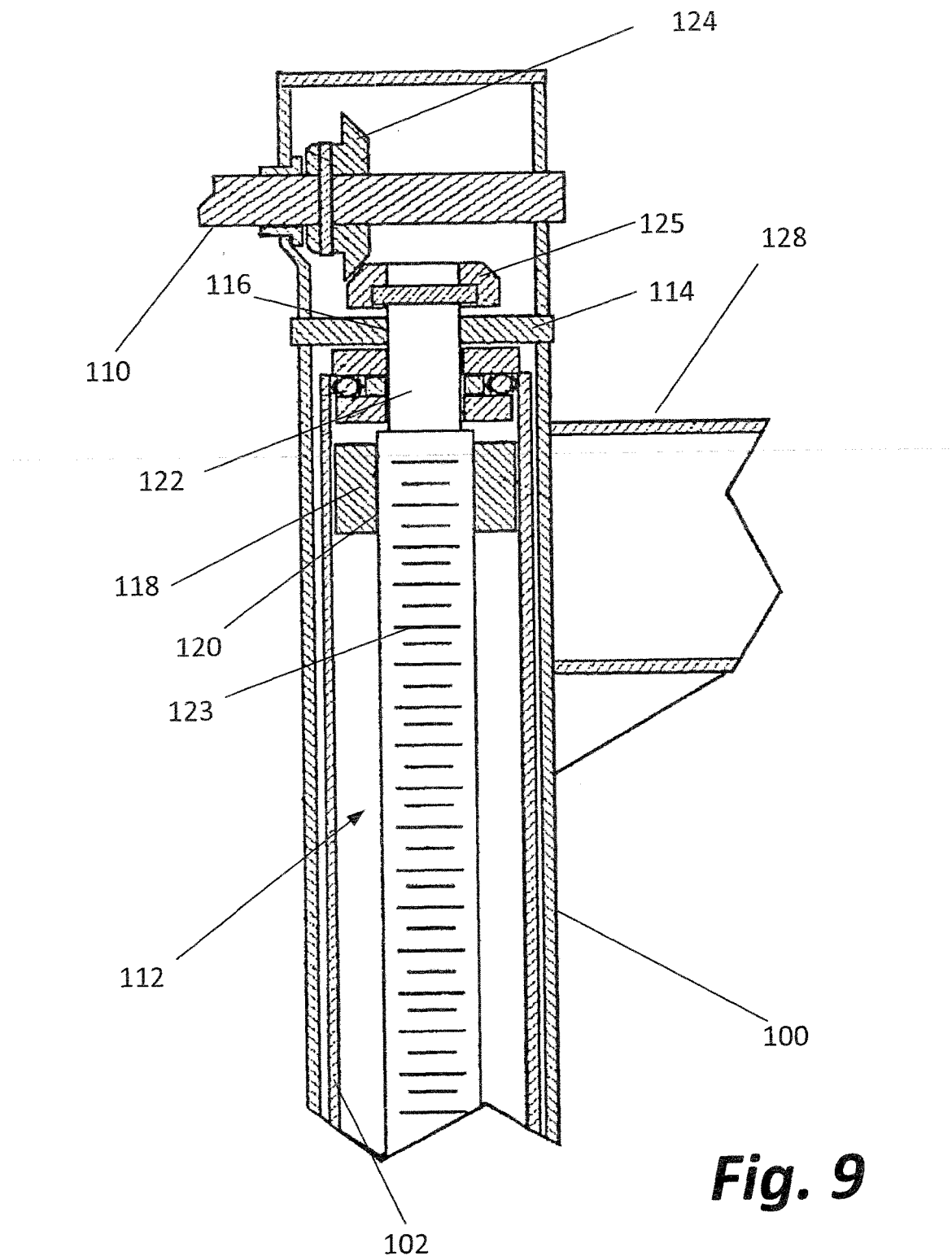
FIG. 9 is a partial, cross-sectional view of one of the legs of the work accessory of FIG. 1.

Located within each leg 90, 92, 94 and 96 and connected to crank 110 is a screw jack 112. Such a screw jack 112 is shown in FIG. 9. The screw jack 112 comprises a first plate 114, with a first bore 116, coupled to the inside surface of telescoping section 100. A second plate 118, with a second bore 120 which is threaded, is secured to the inside surface of telescoping section 102. The bores 116 and 120 are axially aligned. An elongated shaft 122 is adapted to extend through and rotate within the bores 116 and 120. The elongated shaft 122 also has threads 123 that mesh with the threads of the bore 120.

A gear assembly is employed to couple the shaft 122 to crank 110. Specifically, the gear assembly comprises a first gear 124 coupled to the crank 110 and a second gear 125 coupled to the shaft 122. The gears mesh together so that turning the crank 110 in a first direction causes the shaft 122 to turn in a first direction which, due to interaction of the turning shaft 122 with the threaded bore 120 of the plate 118, causes the telescoping sections 100 and 102 to extend thereby lengthening the leg. Rotation of the crank 110 in the opposite direction causes the shaft 122 to turn in a second direction and the telescoping sections 100 and 102 to retract thereby shortening the leg. The crank 110 and internal screw jacks 112 permit fine adjustment of the length of the legs 90, 92, 94, 96 and even permit such adjustment when the full weight of the work accessory 2 is borne by the legs 90, 92, 94, 96.

The adjustment features of the legs 90, 92, 94, 96 permit the height of the rails 62 and 64 to be adjusted and thus aligned, height-wise, with respect to the channels 42 and 44 so the bottoms of rails 62 and 64 are just above the bottoms 54 with the channels 42 and 44. The distance between legs 90 and 92 is wider than the width of the rear end of the UTV 1. Thus, when the rails 62 and 64 are so aligned with the channels 42 and 64, the operator of the UTV 1 can put the UTV 1 into reverse and back the UTV 1 up to mate the rails 62 and 64 with the channels 42 and 44. Alternatively, and if the legs are provided with wheels, the operator easily can push the work accessory 2 forward to mate the rails 62, 64 with the channels 42, 44 and thereby couple the work accessory 2 to the UTV 1. If necessary, the operator can then turn the cranks 110 to shorten the legs 90, 92, 94, 96 and drop the bottom of the rails 62 and 64 onto the bottoms 54 of the channels 42 and 44. Further shortening of the legs will cause the feet 98 to lift off the ground such that the work accessory 2 is fully supported by the UTV 1. After locking the proximal ends of the rails 62 and 64 in the channels 42 and 44, the UTV 1, carrying work accessory 2, can be driven to transport the work accessory 2 (such as the lift platform illustrated in the drawings) to a work site.

At the work site, the legs 90, 92, 94, 96 can again be extended so the feet 98 engage the ground and stabilize the work accessory 2. The legs 90, 92, 94, 96 can also be selectively adjusted to balance or level the work accessory.

Similarly, when an operator wishes to decouple the work accessory 2 from the UTV 1, the operator removes the rail locks, i.e., locking pin 76 and locking plate 80, to free the proximal ends of rails 62 and 64. The operator then extends the legs 90, 92, 94, 96 into ground engagement, and further extends the legs 90, 92, 94, 96 to lift the bottom of the rails 62 and 64 slightly above the bottom wall 54 of the channels 42 and 44. The operator then drives the UTV 1 forward leaving behind the work accessory 2 standing on the legs. Again, if the legs have wheels, the operator can pull the work accessory 2 back from the parked UTV 1 to decouple the work accessory 2 from the UTV 1.

The legs 90-96 may each be permanently attached to either the work accessory 2 or the rail assembly 60. Alternatively, either the work accessory 2 or the rail assembly 60 attached thereto may be provided with receiver slots 126 and the legs 90-96 each provided with a support beam 128 adapted to be selectively received with the receiver slots 126. This arrangement allows the legs to be selectively attached to or detached from the work accessory. The receiver slots 126 and support beams may be provided with holes adapted to be aligned and receives a locking pin to lock the legs in place.

From the foregoing, one of ordinary skill in the art will appreciate that a single operator can easily attach a work accessory 2 to UTV 1 using the present invention. First, the operator adjusts the height of the legs 90-96 so that the bottom of the rails 62, 64 are just above the height of the bottom of the channels 42, 44. The operator then carefully backs the UTV 1 up under the work accessory 2 so that the rails 62, 64 reside in the channels 42, 44 and the wedges 66 are beneath and in engagement with the wedge plates 59. The operator then deploys the rail locks (i.e., the locking pins 76 and/or the lock plates 80 and bolts 84) to lock the proximal ends of the channels 42, 44 and rails 62, 64 to each other. The operator can then lift the bottom of the legs off the ground using either the fine adjustment mechanism (i.e., the crank 110 and screw jack 112) or the course adjustment mechanism (i.e., aligning a different one of holes 106 with hole 108 and using a locking pin to then lock telescoping sections 102 and 104 together with the feet off the ground). The operator can also remove the legs altogether by sliding the support beams 128 of the legs out of the receiver slots 126. With the work accessory 2 locked to the UTV 1 and the legs 90-96 raised or removed, the operator can then transport the work accessory 2 to a job site using the UTV 1.

At the job site, the legs can be deployed to stabilize and level the work accessory. When work is completed, the legs can again be raised and removed and the work accessory 2 may be transported to another location using the UTV 1.

When it is desired to remove the work accessory 2 from the UTV 1 for any reason (e.g., when the operator wishes to use the UTV 1 to transport a different work accessory), the legs are deployed such that the feet 98 are in ground engagement. The rail locks 76 and/or 80 are removed and the operator drives the UTV 1 out from under the work accessory 2 leaving the work accessory 2 behind and standing on its legs 90-96.

Still other locking arrangements may be employed to secure the proximal ends of rails 62 and 64 in the respective channels 42 and 44. The locking arrangement shown in FIGS. 10-12 is highly effective, requires no separate tools and can even be operated by a single operator while an operator is wearing gloves in adverse weather conditions.

Figure 10:
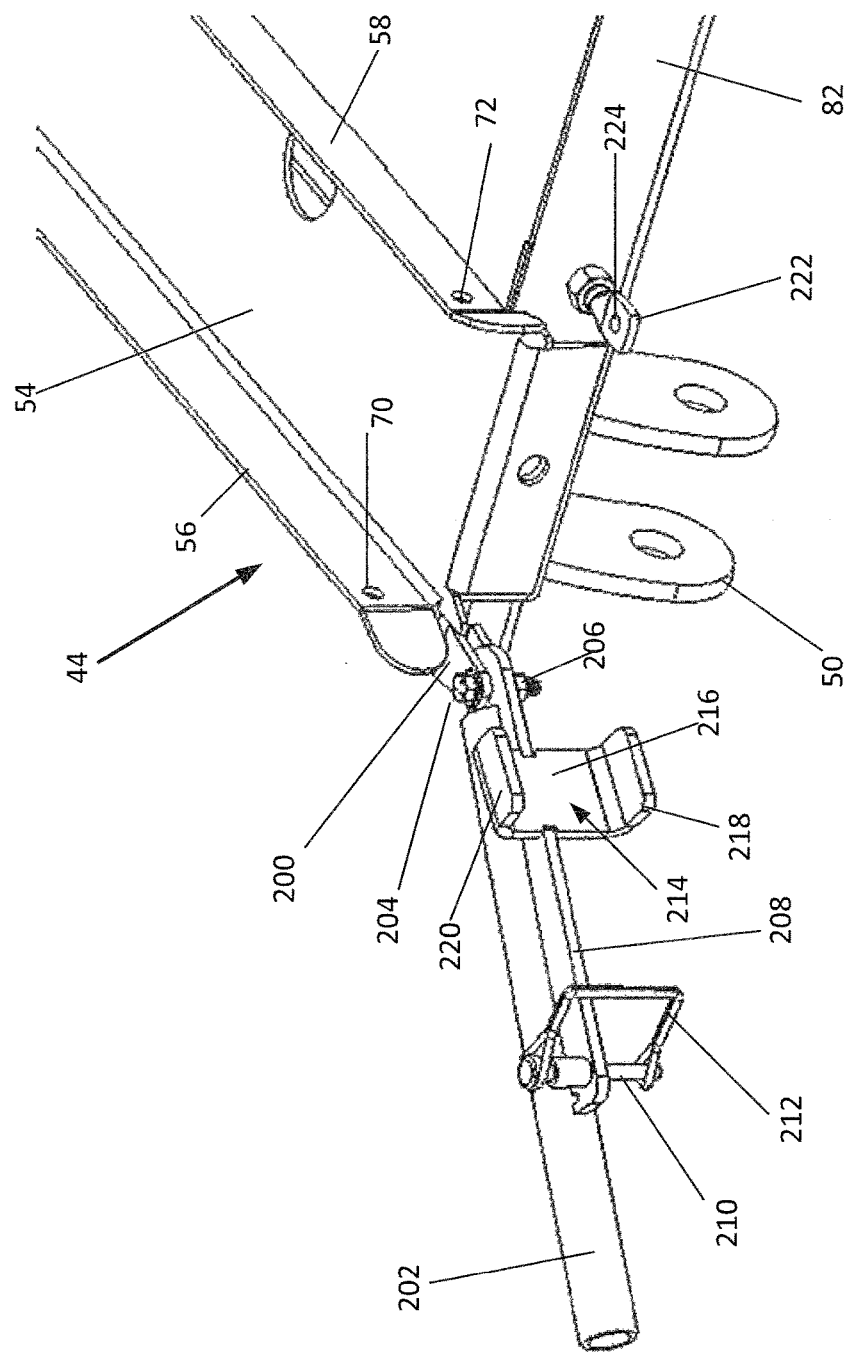
FIG. 10 is a partial perspective view from the rear showing an alternative rail lock assembly for securing a work accessory to a work utility vehicle in its unlocked condition.
Figure 11:
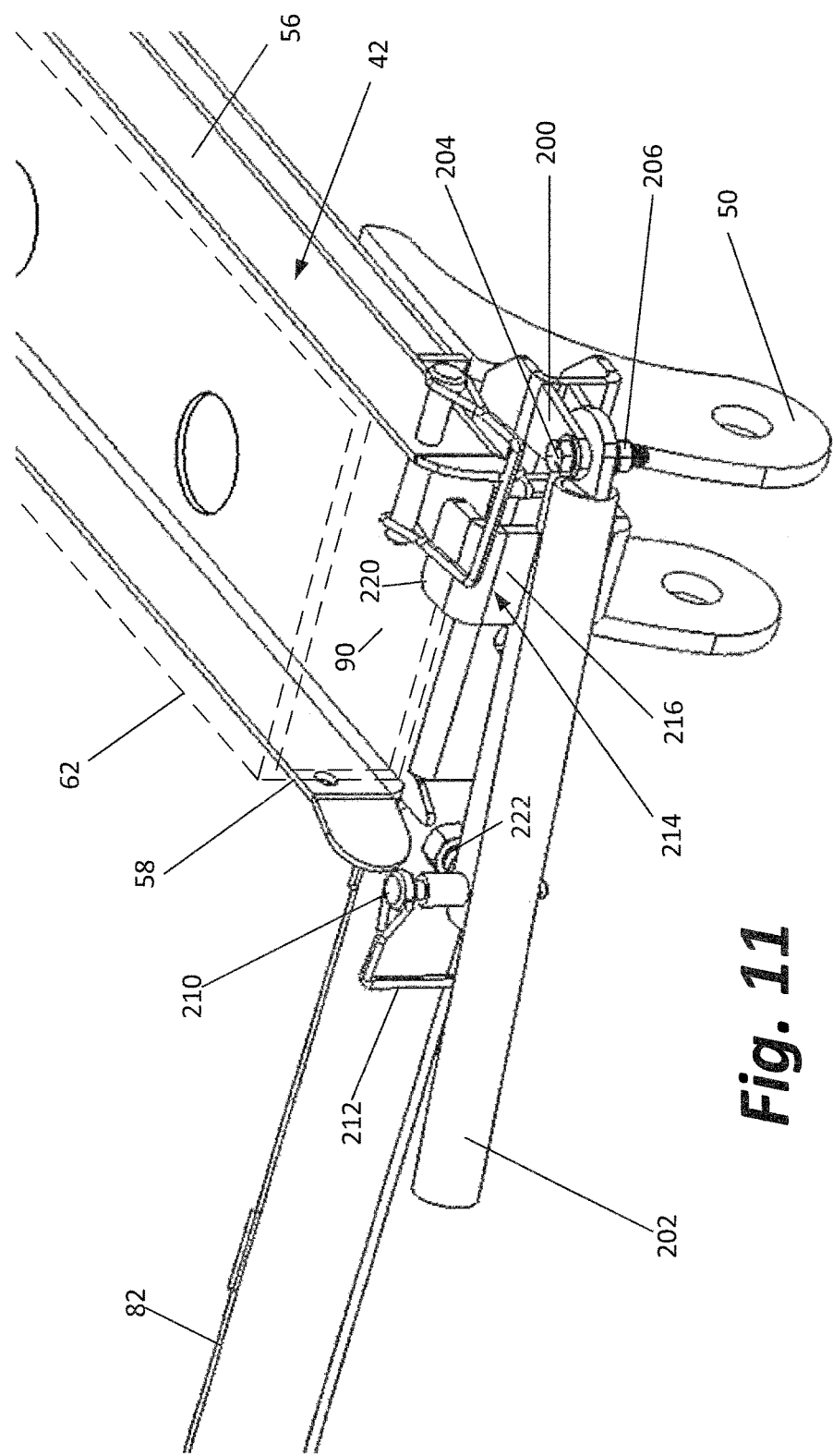
FIG. 11 is a partial perspective view showing the alternative rail lock assembly of FIG. 10 in its locked condition.
Figure 12:
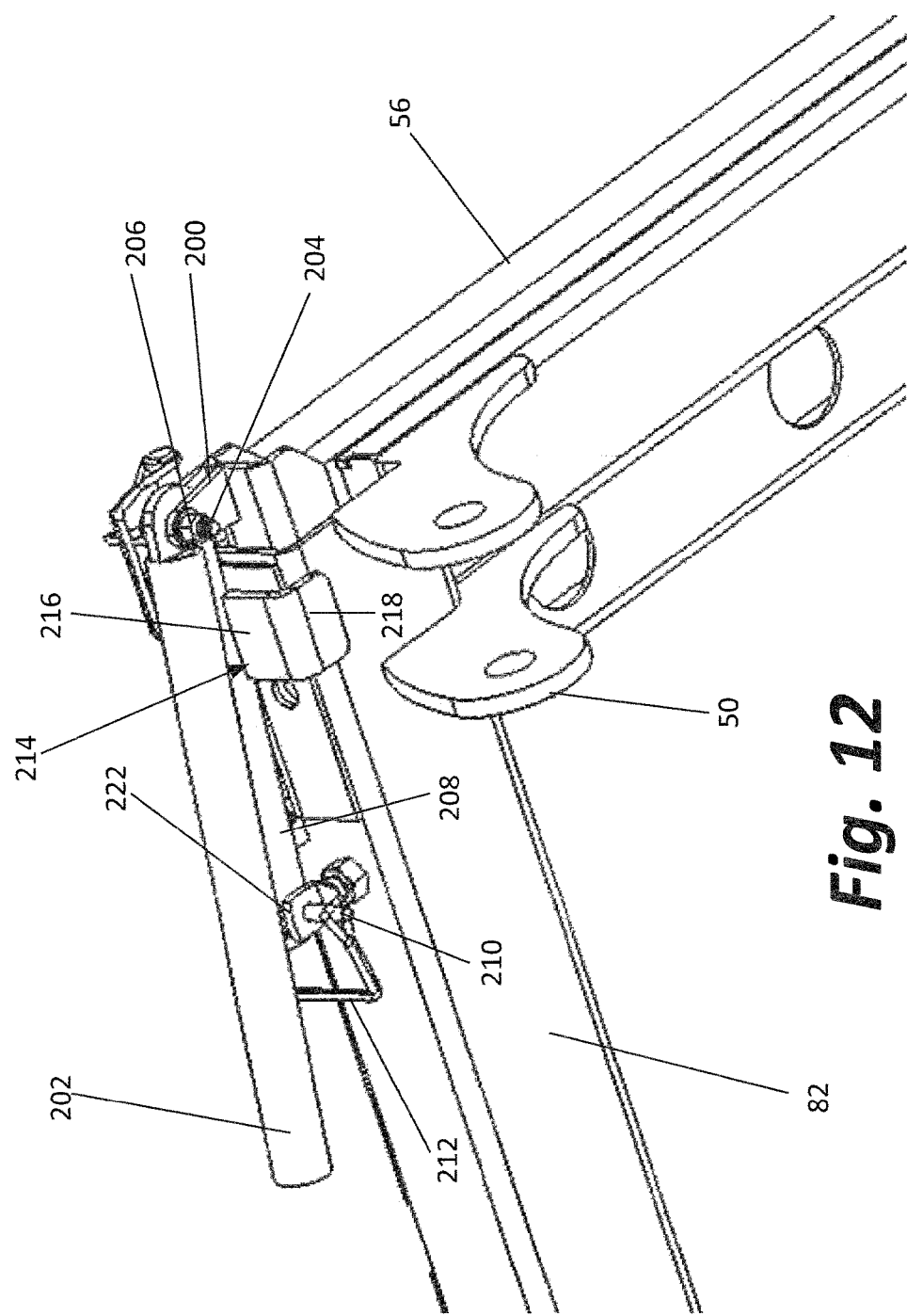
FIG. 12 is another perspective view of the lock assembly of FIGS. 10 and 11 in the locked condition.

The locking arrangement shown in FIGS. 10-12 comprises a mounting flange 200 projecting from each of the two channels 42 and 44. The locking arrangement shown in these drawings also includes an elongate bar 202 pivotally mounted to the mounting flange using a bolt 204 that extends through aligned holes in the elongate bar 202 and mounting flange 200. A nut 206 prevents the bolt 204 from exiting the holes in the mounting flange 200 and elongate bar 202. The bolt 204 and nut 206 not only couples the elongate bar 202 to the flange 200, but the bolt 204 also serves as an axle and defines an axis of rotation that allows the bar 202 to swing between an unlocked position shown in FIG. 10 and a locked position shown in FIGS. 11 and 12.

Several locking elements are coupled to the bar 200 via a plate 208 permanently affixed to and projecting from the bar 200. These include a generally U-shaped lock plate 214 comprising a generally vertical wall 216, a top wall 220, and a bottom wall 218. The top wall 220 and bottom wall 218 project in the same direction from the top and bottom of the generally vertical wall 216. These also includes a hole through the plate 208. The shaft of a pin 210 is able to pass through the hole in plate 208. A spring 212 is coupled to pin 210 both above and below plate 208 to retain the pin 210 in the hole. The spring 212 is generally U-shaped and large enough to be gripped by a user wearing a glove.

When a user wants to couple or decouple an accessory from a work vehicle, the locking bars 202 are rotated out of the way to a position such as that shown in FIG. 10. This permits the rails 62 and 64 of the accessory to be slid into or out of the channels 42 and 44. When the user wants to lock the proximal end of the rails 62 and 64 to the channels 42 and 44 to secure the accessory in place, the user releases the spring 212 by sliding the lower end free of the pin 210 and then removes the pin 210 and spring 212 from the hole in plate 208. The user then rotates bar 202 to the position shown in FIGS. 11 and 12. When the bars 202 are in this position, the top wall 216 of each lock plate 214 resides above surface 90 of the corresponding rail 62 and 64. Likewise, the bottom wall 218 of each lock plate 214 is beneath the corresponding channel 42 and 44. This prevents vertical movement of the rails 62 and 64 with respect to the channels 42 and 44. Likewise, the vertical walls 216 of the lock plates engage the proximal ends of the respective channels 42 and 44 and rails 62 and 64 to prevent horizontal movement of the rails 62 and 64 with respect to the channels 42 and 44. Of course, this locking relationship is only maintained for so long as the bar 202 is in the position shown in FIGS. 11 and 12. To hold the bar 202 in this position, an eye bolt 222 having a bolt hole 224 is coupled to plate 82. The pin hole in each of the plates 208 is adapted to be aligned with the bolt holes 224 of the respective eye bolts 222. When so aligned, the lower end of pin 210 is inserted through the aligned holes in plate 208 and eye bolt 222 and the spring is coupled to the lower end of the pin 210. Thus, the bar 202 is locked in place and the pin 210 cannot be inadvertently dislodged from the holes in the plate 208 and eye bolt 222.

Unlocking the assembly shown in FIGS. 10-12 to permit removal of the accessory from the vehicle simply involves releasing the spring 212 from the lower end of the pin 210, removing the pin 210 from the aligned holes in the plate 208 and eye bolt 222, and swinging the bars 202 to the position shown in FIG. 10.

Still another locking arrangement is shown in FIG. 13. In this embodiment, the frame assembly 40 includes a threaded bolt hole 83 extending through frame member 82 beneath each of the channels 42 and 44 of the channel assembly 40. In FIG. 13, the threaded bolt hole 83 is shown below channel 44. Further, each of the rails 62 and 64 of the rail assembly 60 have a flange 300 extending downwardly from the bottom of the rail at the proximal end. A reinforcement bracket 302 formed at a right angle may be welded to the flange 300 and the bottom portion of the rail. A bolt receiving hole 304 extends through each flange 300 and also through bracket 302 if such a bracket is present. Each bolt receiving hole 304 is adapted to be axially aligned with the corresponding threaded bolt hole 83 in the frame member 82 when the rail assembly 60 is coupled to the frame assembly 40 (i.e., when the rails 62 and 64 are pushed all the way forward in the channels 42 and 44). To lock the proximal end of the rail assembly 60 in place, bolts such as bolt 84 are employed. Bolt 84 has a head and a shaft. The head has a diameter larger than the bolt receiving hole 304 extends through each flange 300 and bracket 302. The shaft has a diameter smaller than the bolt receiving hole 304 and threads adapted to mesh with the threads of the threaded bolt holes 83. As such, the proximal end of the rail assembly 60 can be locked in place by advancing the shaft of bolt 84 through the bolt receiving hole 302 and then connecting the bolt by coupling the shaft with threaded bolt hole 83 and then turning the bolt 84 in the clockwise direction to tighten the bolt 84. To unlock the rail assembly 60 from the channel assembly 40, the user simply turns the bolts 84 in the counter-clockwise direction to loosen the bolts 84 and removes them. The only parts that might be misplaced or lost are the bolts 84. These can commonly be found at any hardware store and are relatively inexpensive such that extras can be kept on hand.

The foregoing description is intended to explain the various features and advantages, but is not intended to be limiting. The scope of the invention is defined by the following claims which are also intended to cover a reasonable range of equivalents.

What is claimed is:
1. An apparatus comprising:
 a) a self-powered and steerable utility vehicle having a front, a rear, and a frame assembly between the front and the rear;
 b) a work accessory having a base;
 c) a mounting assembly comprising a channel assembly and a rail assembly,
  i. said channel assembly coupled to the frame of the vehicle and comprising a first channel and a second channel extending parallel to each other above the frame of the vehicle from a location adjacent the rear of the vehicle toward the front of the vehicle, each of said channels defined by a bottom wall, a pair of spaced apart side walls projecting upwardly from the bottom wall, an open top, an open proximal end and a wedge plate defining the distal end of the channel, said wedge plate extending at an angle upwardly and rearwardly between the two side walls;
  ii. said rail assembly coupled to the base of the work accessory comprising a first and rails extending parallel to each other below the base of the work accessory, said rails each having a proximal end portion and a distal end portion, the distal end portion of each rail comprising a wedge, said rails adapted to simultaneously slide into said channels to engage the wedges of the rails with the wedge plates of the channels to secure the distal end of the rails in the channels; and
  iii. a lock for securing the proximal end portion of each rail in place with respect to the channel.

2. The apparatus of claim 1 wherein said lock comprises first holes through the two side walls of one of the channels adjacent the open proximal end and a second hole through the rail received in said one of the channels adjacent the proximal end of the channels, said first holes and second hole adapted to be aligned when said rail is in said channel and the wedge of the rail is in locking engagement with the wedge plate, and wherein said lock further comprises a pin adapted to be received within said aligned first holes and second hole.

3. The apparatus of claim 1 further comprising a set of legs coupled to the work accessory, each of said legs comprising telescoping sections adapted to permit the length of the legs to be adjusted to align the height of the rails with the height to the channels when coupling the work accessory to and decoupling the work accessory from the utility vehicle.

4. The apparatus of claim 3 where each leg has an internal screw jack and crank for adjusting the length of the leg.

5. The apparatus of claim 3 wherein said legs comprise a front pair of legs and a back pair of legs and the distance between the front pair of legs is greater than the width of the utility vehicle.

6. The apparatus of claim 3 wherein said work accessory is a work platform lift further comprising a work platform, a scissor lift mechanism coupled to the base and the work platform, and a telescoping actuator that cooperates with the scissor lift mechanism to raise and lower the platform with respect to the base, and wherein the legs are adapted to stabilize the utility vehicle and the work accessory as the work platform is raised and lowered and as a the work platform is being used when raised to perform work.

7. The apparatus of claim 3 further comprising a foot projecting outwardly from the bottom of each leg.

8. The apparatus of claim 1 wherein the channel assembly is removably coupled to the frame of the utility vehicle.

9. The apparatus of claim 1 wherein the channel assembly is pivotally coupled to the frame of the utility vehicle.

10. The apparatus of claim 1 wherein said lock comprises a lock plate adapted to engage both an upwardly facing surface of a rail and a rearwardly facing surface of a rail, and adapted to be secured in place to prevent both upward and rearward movement of the rail with respect to the channel.

11. The apparatus of claim 10 wherein said lock plate is coupled to a bar that is adapted to be rotated between a locked position and an unlocked position, and said lock further comprises a member positionable by hand to lock the bar in a locked position.

12. An apparatus comprising:
  a) a self-powered and steerable utility vehicle having a front, a rear, and a frame assembly between the front and the rear;
  b) a work accessory having a base and wherein said work accessory is a work platform lift further comprising a work platform, a scissor lift mechanism coupled to the base and the work platform, and a telescoping actuator that cooperates with the scissor lift mechanism to raise and lower the platform with respect to the base;
  c) a mounting assembly comprising a channel assembly and a rail assembly,
    i. said channel assembly coupled to the frame of the vehicle and comprising a first channel and a second channel extending parallel to each other above the frame of the vehicle from a location adjacent the rear of the vehicle toward the front of the vehicle, each of said channels defined by a bottom wall, a pair of spaced apart side walls projecting upwardly from the bottom wall, an open top, an open proximal end and a wedge plate defining the distal end of the channel, said wedge plate extending at an angle upwardly and rearwardly between the two side walls;
    ii. said rail assembly coupled to the base of the work accessory comprising a first and rails extending parallel to each other below the base of the work accessory, said rails each having a proximal end portion and a distal end portion, the distal end portion of each rail comprising a wedge, said rails adapted to simultaneously slide into said channels to engage the wedges of the rails with the wedge plates of the channels to secure the distal end of the rails in the channels; and
    iii. a lock for securing the proximal end portion of each rail in place with respect to the channel; and
  d) a plurality of legs adapted to stabilize the utility vehicle and the work accessory as the work platform is raised and lowered and as a the work platform is being used when raised to perform work.

13. The apparatus of claim 12 wherein each of said legs include telescoping sections adapted to permit the length of the legs to be adjusted to align the height of the rails with the height to the channels when coupling the work accessory to and decoupling the work accessory from the utility vehicle.

14. The apparatus of claim 12 where each leg has an internal screw jack and crank for adjusting the length of the leg.

15. The apparatus of claim 12 wherein the legs are also adapted to level the work accessory when the work accessory is coupled to the vehicle and operating.

16. The apparatus of claim 12 wherein said legs comprise a front pair of legs and a back pair of legs and the distance between the front pair of legs is greater than the width of the utility vehicle.

17. The apparatus of claim 12 further comprising a foot projecting outwardly from the bottom of each leg.

18. The apparatus of claim 12 wherein said lock comprises first holes through the two side walls of one of the channels adjacent the open proximal end and a second hole through the rail received in said one of the channels adjacent the proximal end of the channels, said first holes and second hold adapted to be aligned when said rail is in said channel and the wedge of the rail is in locking engagement with the wedge plate, and wherein said lock further comprises a pin adapted to be received within said aligned first holes and second hole.

19. The apparatus of claim 12 wherein the channel assembly is removably coupled to the frame of the utility vehicle.

20. The apparatus of claim 12 wherein the channel assembly is pivotally coupled to the frame of the utility vehicle.

* * * * *